Aug. 22, 1933.  E. P. GILLETTE  1,923,084
METHOD AND APPARATUS FOR BURNING LIMESTONE AND THE RECOVERY OF CARBON DIOXIDE
Filed Nov. 5, 1930
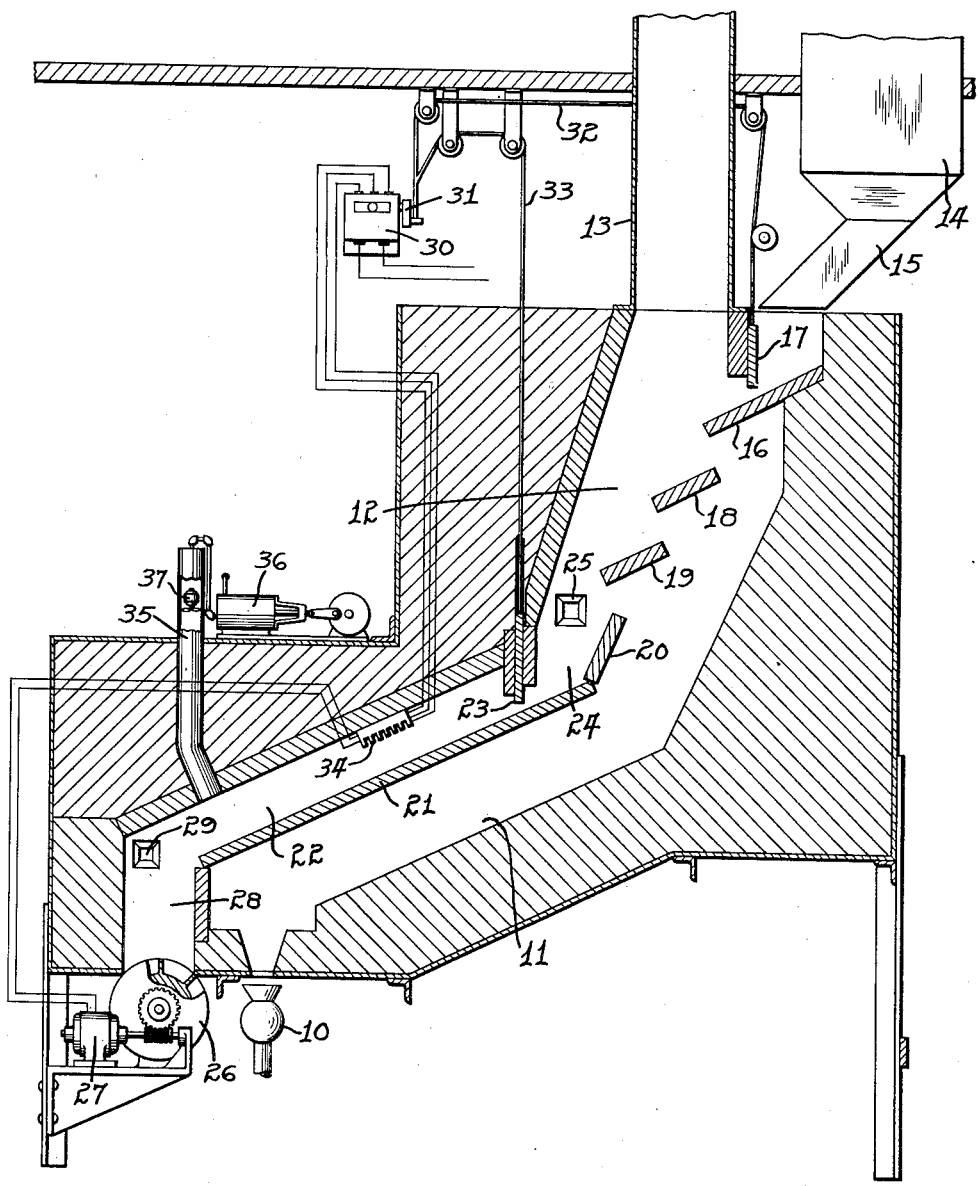
Inventor
Edward P. Gillette
By Owen & Owen
Attorneys

UNITED STATES PATENT OFFICE 1,923,084

METHOD AND APPARATUS FOR BURNING LIMESTONE AND THE RECOVERY OF CARBON DIOXIDE

Edward P. Gillette, Toledo, Ohio, assignor to Gillette Research Corporation, Toledo, Ohio, a Corporation of Ohio Application November 5, 1930. Serial No. 493,520

5 Claims. (Cl. 222—4)

This invention relates to the manufacture of lime, but more particularly to a method and apparatus for burning limestone, and the recovery of carbon dioxide generated thereby.

Heretofore, so far as I am aware, no commercially satisfactory method has been evolved for burning limestone in granular or powdery form. As a consequence, tons of comminuted limestone are discarded by lime plants as useless for practical purposes. It is manifest that a commercially practical method of burning such limestone would inure greatly to the benefit of the lime industry.

It is an object of my invention to produce a simple and efficient method and suitable apparatus therefor for burning limestone in which the material flows by gravity uniformly through a region, the temperature of which is maintained suitable for the purpose, the material, however, being preheated in its passage to such region.

In the burning of limestone, carbon dioxide is generated, but so far as I know, no one has successfully recovered this gas. According to another phase of my invention I am able satisfactorily to recover carbon dioxide which is generated in the lime kiln. Another object is, therefore, to recover in a commercially usable manner the greater portion of the carbon dioxide resulting from the burning of limestone.

Other objects and advantages of the invention will hereinafter appear, and by way of illustration, but not of limitation, an embodiment of the invention is shown on the accompanying drawing, in which:

The figure is a vertical sectional elevation, partly diagrammatic, of a simple and practical kiln which may be used in practicing my method.

Referring to the drawing, the kiln comprises a furnace 10, which is preferably in the form of an oil burner because of its economy in operation and degree of heat obtainable. Heated gases from the furnace 10 pass upwardly along the incline passage 11, and thence upwardly through a preheating chamber 12 to the stack 13, which may discharge to the outside.

Limestone in powdery or granular form is delivered to an elevated hopper 14 having a discharge chute 15. As shown, the hopper is disposed above the preheating chamber 12 for a purpose hereinafter discussed. From the chute 15, the limestone falls upon a downwardly inclined plate 16, preferably of carborundum or other material, which may successfully withstand high temperatures, but has a large capacity for heat conductivity. Carborundum, specifically silicon carbide is particularly advantageous since comminuted limestone has no affinity for it, so that the material is enabled freely to flow over its surface even when subjected to very high temperatures. The angle of the plate 16 is such that the material from the hopper 14 flows readily thereover by gravity, but a gate 17 is provided for controlling the natural flow along the plate 16.

From the plate 16 the limestone passes successively over carborundum plates 18 and 19, which are spaced vertically from each other and arranged in step formation. The plates 18 and 19 may be inclined at angle similar to that of the plate 16 to effect uniformity in the material flow through the preheated chamber 12. It will be manifest that during the flow of the limestone through the preheating chamber 12 the limestone will be heated by the heated gases passing therethrough. Furthermore, the plates 16—18 and 19 will be heated to a very high temperature, and, consequently, will assist in heating the limestone. The number and arrangement of plates, such as 16—18 and 19, may be varied as the conditions of service require.

From the plate 19 the limestone falls to a carborundum guide plate 20, the vertical inclination of which may be greater than that of the plate 19, and the plate 20 directs the material to the upper surface of a longitudinally elongate wall 21 of carborundum which forms the bottom wall of a reaction chamber 22. The flow of material to the reaction chamber is controlled by a gate valve 23 disposed slightly in advance of the guide plate 20. It will be observed that adjacent the guide plate 20 is formed a chamber 24, adjacent which is a slight opening 25. In practice, it is desirable to have a quantity of limestone in the chamber 24 to militate against the escape of gases from the reaction chamber 22.

It is apparent that the reaction chamber 22 is disposed in the region of greatest heat, since it is adjacent the furnace 10. The temperature within the chamber 22 must be suitable for the burning of limestone. Since the limestone has been preheated in its passage from the hopper 14 to the reaction chamber, there is no difficulty in increasing its temperatue in the reaction chamber to the desired degree and enable it to flow by gravity therethrough. After passing through the chamber 22, the burning of the limestone is completed and the calcium oxide may be discharged mechanically by a pocketed wheel 26 operatively connected for rotation to a motor 27. The wheel 26 also serves as a valve, as will readily be apparent. It is desirable to retain a quantity of the burnt limestone in a discharge chamber 28 in order to seal that end of the reaction chamber and prevent the escape of gases. A slight opening 29 is provided for the outlet chamber 28 to afford ready inspection thereof.

It is to be understood that the bottom wall 21 of the reaction chamber is inclined at an angle similar to that of the plates 16—18 and 19, and the length thereof is so chosen that the limestone will be completely and satisfactorily burned before being discharged. I have found that satisfactory results may be obtained if the powdery or granular limestone passes through the reaction chamber in a continuous layer approximately three-eights to one-half inch thick at the rate of one inch per second, the length of the reaction chamber being four feet. The temperature within the reaction chamber should be of the order of 2100° F. to obtain best results in the apparatus illustrated.

In order automatically to control the gates 17 and 23, a suitable motor 30 having an arm 31 is provided, and the arm 31 may be connected by cables 32 and 33 guided by suitable sheaves to the gates 17 and 23 respectively. The operation of the motor 30 is controlled by a thermostat 34 located within the reaction chamber 22. The thermostat 34 may be of any suitable construction and operates to energize the motor 30 to open the gates 17 and 23 when the temperature in the reaction chamber reaches a degree suitable for burning the limestone. However, when the temperature within the reaction chamber 22 drops below a predetermined minimum the motor 30 is deenergized, thereby permitting the gates 17 and 23 to drop by gravity to closed position. For this purpose it is desirable that the gates 17 and 23 be weighted in order to effect satisfactory closures when the cables 32 and 33 are released. The thermostat 34 is also connected to the motor 27, the connection being such that the motor is energized when the gates 17 and 23 are opened, but deenergized when they are closed.

An important feature of my invention resides in the recovery of the carbon dioxide generated in the reaction chamber 22 by the burning of the limestone. As above described, the quantities of material in the chambers 24 and 28 disposed at opposite ends of the reaction chamber provide a substantial seal for the chamber. Leading from the top wall of the chamber 22 is a duct 35 leading to a compressor unit 36 suitable for handling carbon dioxide. Such units are usually multi-stage, and, since the same forms no part of this invention, merely a diagrammatic showing is made. Suction may be created in the duct 36 by a motor-operated fan 37. It is thus evident that carbon dioxide evolved in the burning of limestone may be recovered in an extremely simple but highly efficient manner. The gas may either be solidified by compression or delivered to suitable reservoirs.

It is to be understood that numerous changes in the construction and operation hereinbefore described may be effected without departing from the spirit of the invention, especially as defined in the appended claims.

What I claim as new and desire to secure by Letters Patent is:

1. The method of burning limestone which comprises introducing the limestone into a muffle chamber having an inlet and an outlet opening, substantially sealing the inlet opening by the limestone, progressing the limestone through the chamber during burning and in contact with a wall thereof, heating said wall, and withdrawing the carbon dioxide from said chamber.

2. The method of burning limestone which comprises passing a stream of limestone through a reaction chamber having an inlet and an outlet opening while substantially sealing said openings by the limestone, heating a wall of said chamber from the outside sufficiently to effect chemical reaction of the limestone, and withdrawing from said chamber laterally of the stream the products of dissociation.

3. The method of burning limestone which consists in heating one side of a silicon carbide wall to a sufficiently high temperature to effect dissociation of carbon dioxide from limestone on the other side thereof, passing limestone in a stream by gravity past and in contact with the other side of said wall, and withdrawing carbon dioxide from the stream of limestone as it passes said wall.

4. The method of burning limestone which comprises heating a silicon carbide wall to a sufficiently high temperature to effect dissociation of carbon dioxide from limestone thereon, and passing particles of comminuted limestone along and in contact with said wall.

5. The method of burning limestone which comprises introducing the limestone into a muffle chamber having an inlet and an outlet opening and a wall which is a good conductor of heat and to which the limestone does not adhere at a temperature sufficient to effect dissociation of carbon dioxide from the limestone, substantially sealing the inlet and outlet openings, progressing the limestone through the chamber during burning and in contact with said wall of the chamber, heating said wall to a sufficiently high temperature to effect dissociation of carbon dioxide from the limestone in contact therewith, and withdrawing the carbon dioxide from said chamber.

EDWARD P. GILLETTE.